SR
12/10/85 OR 4,558,201

United States Patent [19]
Hatch

[11] Patent Number: 4,558,201
[45] Date of Patent: Dec. 10, 1985

[54] PLASMA-ARC TORCH WITH GAS COOLED BLOW-OUT ELECTRODE

[75] Inventor: Bruce O. Hatch, Lebanon, N.H.

[73] Assignee: Thermal Dynamics Corporation, West Lebanon, N.H.

[21] Appl. No.: 679,913

[22] Filed: Dec. 10, 1984

[51] Int. Cl.[4] .................................... B23K 9/00
[52] U.S. Cl. .................... 219/121 PM; 219/121 PR; 219/121 PQ; 219/75; 313/231.51
[58] Field of Search .................. 219/121 PP, 121 PQ, 219/121 PM, 121 PR, 121 P, 74, 75, 76.16, 121 PN; 313/231.21, 231.31, 231.41, 231.51; 315/111.21

[56] References Cited

U.S. PATENT DOCUMENTS

| | | | |
|---|---|---|---|
| 2,960,594 | 11/1960 | Thorpe | 219/121 PR |
| 4,059,743 | 11/1977 | Esibian et al. | 219/121 PR |
| 4,311,897 | 1/1982 | Yerushalmy | 219/121 PP |

*Primary Examiner*—M. H. Paschall
*Attorney, Agent, or Firm*—Majestic, Gallagher, Parsons & Siebert

[57] ABSTRACT

A plasma arc cutting torch housing defines a chamber which has an outlet at the end of the housing. The torch also includes an electrode in the chamber near the outlet and means in the chamber for separating the gas flowing towards the outlet of the housing into a primary gas flow adjacent to the electrode for generating a plasma and a secondary gas flow away from the electrode for cooling the torch and the workpiece. The electrode has a centrally disposed bore therethrough for conveying gas. Inserts in the bore at opposite ends of the electrode burn away so as to expose the centrally disposed bore and thereby automatically quench operation of the plasma arc so as to prevent damage to the torch. In the preferred embodiment, the electrode has a centrally disposed transverse bore and a pair of transverse bores intermediate the central bore and the electrode ends. In an alternate embodiment, the pair of transverse bores are eliminated and gas is conducted by means of an annular gas distributor.

18 Claims, 7 Drawing Figures

PLASMA-ARC TORCH WITH GAS COOLED BLOW-OUT ELECTRODE

BACKGROUND OF THE INVENTION

This invention is related generally to plasma torches which are generally used for metal cutting, and to an improved gas-cooled electrode for such torches.

Plasma torches, also known as electric arc or plasma-arc torches, are commonly used for cutting of workpieces and operate by directing a plasma consisting of ionized gas particles toward the workpiece. In the operation of a typical plasma torch, such as illustrated in U.S. Pat. Nos. 4,324,971, 4,170,727 and 3,813,510, assigned to the same assignee as the present invention, a gas to be ionized is supplied to the front end of the torch in front of a charged electrode. The tip which is adjacent to the end of the electrode at the front end of the torch has a sufficiently high voltage applied thereto to cause a spark to jump across the gap between the electrode and tip thereby heating the gas and causing it to ionize. A pilot DC voltage between the electrode and the tip maintains a non-transferred arc known as the pilot arc. The ionized gas in the gap appears as a flame and extends outwardly from the tip. As the torch head or front end is moved towards the workpiece, a transferred or cutting arc jumps from the electrode to the workpiece since the impedance of the workpiece current path is lower than the impedance of the welding tip current path.

In conventional torches, the charged electrode is typically made of copper with a tungsten electrode insert and current flows between the tungsten insert and the torch tip or workpiece when the torch is operated. Tungsten is oxidized easily at high temperatures so that if the gas to be ionized is air, the tungsten insert becomes oxidized and is rapidly consumed, thus necessitating frequent replacement. The gas to be used for creating the plasma is typically an inert gas, such as nitrogen or argon, in order to reduce oxidation and thereby prolong electrode life. Where air is used, materials resistant to oxidation such as hafnium or zirconium have been used as the electrode insert material.

Frequently, a secondary gas flow is also provided in conventional plasma torches for various different purposes. The most common purpose of a secondary gas flow immediately adjacent and surrounding the electric arc is to cool the torch. The secondary gas helps to blow away the metal that is melted by the arc which helps to achieve a straighter kerf and therefore a cleaner cut. In conventional plasma torches, two gas lines are provided: one for supplying the plasma forming gas and the other supplying gas for the secondary gas flow. If different gases are used for the plasma forming gas and the secondary gas, operation of the torch will require two gas supplies, lines, etc. Having to use two gas lines is inconvenient to torch operators and using two gas supplies is expensive. Therefore, it is desirable to provide a plasma torch which requires only one gas line and only one gas supply. My co-pending Application Ser. No. 515,913 filed July 20, 1983, also assigned to the same assignee hereof, shows such a plasma-arc torch.

It is thus desirable to have a plasma-arc torch which uses only a single gas both for the plasma forming gas as well as the secondary gas. It is also desirable that the gas be air for reasons of availability and economy, as well as the faster speed and improved cut qulity due to the exothermic reaction of the oxygen with the iron when cutting carbon steel. It is also advantageous that the electrode be cooled so as to decrease consumption of the electrode insert.

SUMMARY OF THE INVENTION

The plasma arc torch of this invention includes an electrode in a chamber near the outlet and means in the chamber for separating the gas flowing towards the outlet of the housing into a primary gas flow adjacent to the electrode for generating a plasma and a secondary gas flow away from the electrode for cooling the torch and the workpiece.

The electrode also includes cooling passages therein to enhance the cooling effect of the secondary gas flow. Additionally, the cooling passages provide a "blow-out" feature so as to automatically extinguish and prevent re-starting of the cutting arc when the electrode is totally consumed. This feature is accomplished by an increased gas flow through the arc chamber due to the opening up of communication between a main, axial cooling passage in the electrode and the arc chamber caused by the burning away of the electrode insert which normally blocks this axial passage.

DETAILED DESCRIPTION OF THE PREFERRED EMBODIMENT

Figure 1:
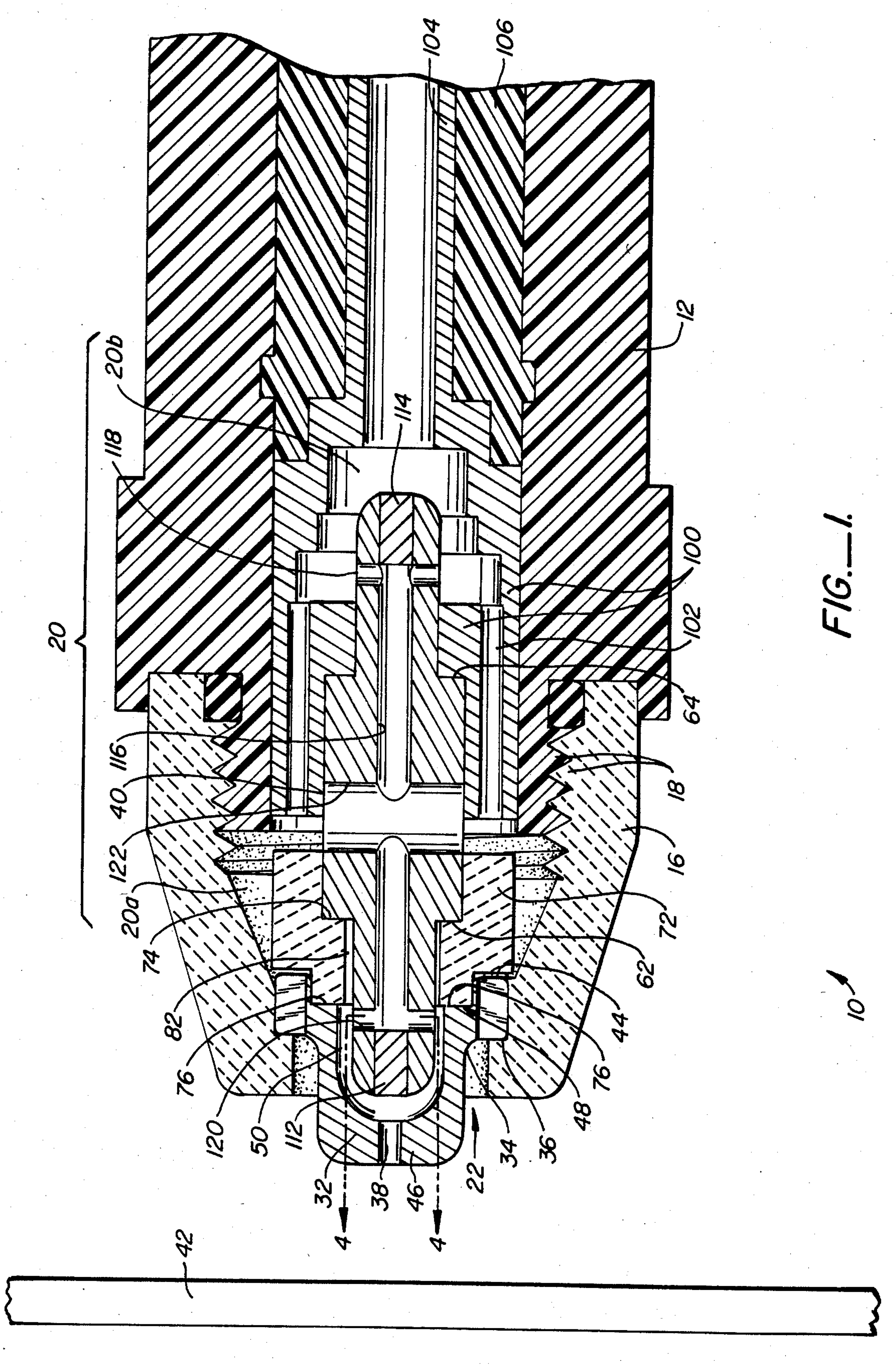
FIG. 1 is a cross-sectional view of the front part (torch head) of a plasma torch illustrating the preferred embodiment of this invention.

FIG. 1 is a cross-sectional view of the front portion, or torch head, illustrating the preferred embodiment of this invention. As shown in FIG. 1, the plasma torch 10 comprises a torch housing 12 and a cup 16. The cup and the housing may be connected by any conventional means so long as the connection is sturdy after connecting and that the two may be easily disconnected. In the preferred embodiment, the cup and housing are threaded in a complementary manner so that the cup may be screwed onto the housing by means of threads 18. Constructed in this manner, the cup portion may be disconnected so that the electrode and torch tip assembly described below may be easily assembled or disassembled.

Figure 2:
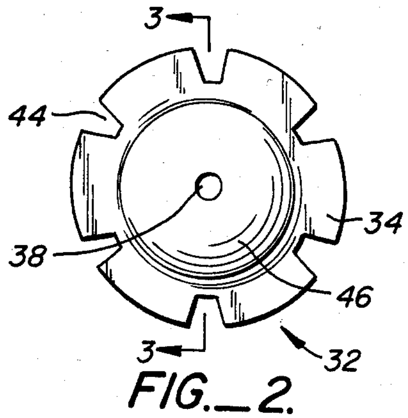
FIG. 2 is an elevational view of the torch tip of the preferred embodiment of this invention.

As shown in FIG. 1, both the housing and cup are cylindrical so as to define a cylindrical chamber 20. The side of the cup away from the housing tapers and has an outlet 22 through which chamber 20 communicates with the exterior. A cup-shaped torch tip 32 fits into the outlet 22 thereby closing the outlet except for some controlled openings in the torch tip, as will be hereinafter described. The cup-shaped torch tip has an annular rim 34 shaped to fit into shoulder 36 on the inside surface of the cup near outlet 22. The cup-shaped torch tip has an orifice 38 in its bottom 46 (bottom of the cup) for passage of the transferred arc between electrode 40 and a representative workpiece such as plate 42. As seen in FIG. 2, rim 34 of the torch tip has slots 44 which allow passage of gas from chamber 20 towards the workpiece to form the secondary gas flow. Thus, when a gas supply (not shown) supplies a gas to chamber 20 flowing towards the outlet 22, the gas may escape through orifice 38 or slots 44 in the torch tip.

Figure 3:
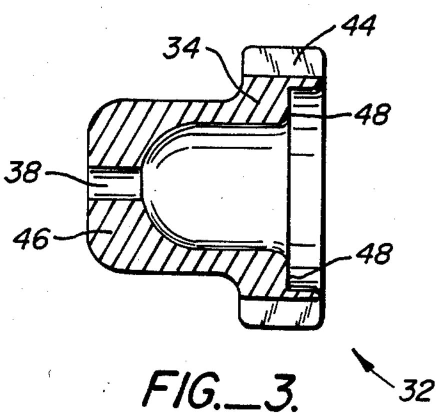
FIG. 3 is a cross-sectional view of the torch tip of FIG. 2 taken along the lines 3—3 of FIG. 2.

FIGS. 2 and 3 illustrate the construction of the torch tip in more detail. As shown in FIGS. 2 and 3, the torch tip defines a flange shaped rim 34 with six evenly spaces slots 44. Rim 34 is recessed and has a shoulder 48 for connection with an annular member described below.

In reference to FIG. 1, the front end of electrode 40 has a portion which extends into the torch tip leaving an annular space 50 between it and the torch tip through which gas from chamber 20 may flow towards and through orifice 38. In the preferred embodiment, electrode 40 is cylindrical in shape and has a middle portion with a larger diameter than the two ends of the electrode which enables the electrode to be conveniently connected to the torch housing. The raised middle portion of the electrode defines two shoulders 62 and 64. An annular insulator 72 is connected between shoulder 48 of the torch tip and the front shoulder 62 of electrode 40. The annular insulator surrounds electrode 40. The side of the annular insulator in contact with the electrode has a recess defining a shoulder 74. The raised middle portion of the electrode fits into this recess so that when the annular insulator is connected to the electrode, shoulder 74 of the annular insulator abuts shoulder 62 of the electrode. The annular insulator on the side opposite the shoulder 74 has a smaller outside diameter so that it fits into the recess in the rim of the torch tip. When the torch tip and the annular insulator are connected, the annular side 76 of the annular insulator abuts annular shoulder 48 of the torch tip. The inside diameter of the annular insulator adjacent to surface 76 is slightly larger than the diameter of the front end of the electrode. Therefore, when the annular insulator is connected between the electrode and the torch tip, the annular insulator and the electrode defines therebetween a second annular chamber 82 which is in communication with the annular chamber 50 on one side but closed on the other.

As shown also in FIG. 1, the annular insulator does not block the secondary gas flow from chamber 20 through slots 44 of the torch tip towards the workpiece. In the center of chamber 20 is body 100 defining a hole in its center into which the electrode fits. When body 100 and electrode 40 are in the positions as shown in FIG. 1, they divide chamber 20 into a front portion 20*a* and a rear portion 20*b*. The body 100 further defines channels 102 around the electrode through which gas may pass between portions 20*a*, 20*b* of chamber 20. The outside diameter of body 100 is such that it fits snugly into housing 14. The body 100 has a portion 104 in the shape of a tube which extends away from the electrode allowing the gas from the gas supply to flow therein. The space between the tube portion 104 and the housing is filled by a potting material 106 such as epoxy which glues the body 100 and its extension 104 to the housing. This will prevent slippage of the body.

When gas is supplied to tube 104, it will flow through the rear portion 20*b* of chamber 20 and channels 102 to reach front portion 20*a* of chamber 20. Some of the gas will then flow through cross passages 122, axial passage 116, cross passage 120, into annular space 50 and thence out through orifice 38. The remainder of the gas will flow through slots 44 and then through the unblocked portion of outlet 22 between the torch tip and the front portion of the cup towards the workpiece for cooling the torch and the workpiece. If the plasma torch 10 is used for cutting the workpiece, the gas pressure supplied to chamber 20 should be high enough and slots 44 should be large enough to create a strong secondary flow for blowing away molten material from the cutting operation. The gas flow rates through slots 44 would depend on the relative cross-sectional areas of cross passages 120 to slots 44. Therefore, by selecting the appropriate ratio between cross sectional areas, the flow rates of the plasma and secondary gas flows will be in predetermined ranges. The above described design for torch 10 renders it possible to use only one gas line and one gas supply to supply both plasma and secondary gas so that the plasma torch of this invention is cheaper and more convenient for torch operators to use.

Electrode 40 has in each of its two ends an insert 112 and 114, respectively, of metal material having good longevity at high temperatures such as hafnium or zirconium or alloys thereof. Electrode 40 is made of electrically conductive metal such as, for example, copper. The two inserts as well as the front and back ends of the electrode are substantially identical, so that when insert 112 is consumed, reversing the electrode to replace the front end with the back end with insert 114 will enable the torch to operate as before. Insert 114 therefore is a spare ready for use when insert 112 has been consumed.

Figure 4:
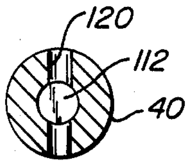
FIG. 4 is a cross-sectional view of the electrode taken along lines 4—4 in FIG. 1.
Figure 5:
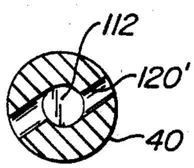
FIG. 5 is a view similar to FIG. 4 showing an alternate embodiment wherein the passages are tangentially oriented.

Enhanced cooling is provided by means of axially directed passage 116 which extends clear through electrode 40. Passage 116 is normally blocked at its opposite ends by inserts 112, 114. Gas flows into passage 116 from cross bore 122. Thereafter, the gas flows through passages 120 and into annular space 50. As may be seen in FIG. 4 passages 118, 120 may be straight. Alternatively, and as shown in FIG. 5, they may be tangent to axial passage 116 so as to impart a swirl to the gas flowing therethrough which helps stabilize the arc.

The cross bore 122 extends through electrode 40 at a position that is centrally disposed between its ends. This bore is of a diameter greater than that of axial passage 116, which is in turn of a diameter greater than that of passage 118, 120. Passage 118, 120 must be smaller than passage 116 so that they may serve to meter the flow of gas therethrough. It has been found that a ratio of cross sectional areas of 2:1 or larger, gives sufficient air flow when combined with normal supply pressures to have a quenching effect on the arc. As an example, an axial passage 116 having a diameter of 0.062 inches and two cross passages 118 each having a diameter of 0.025 inches producing a ratio of areas of approximately 3:1 has been found to be effective. In general, the axial passage must be of sufficient cross-sectional area when combined with normal supply pressures so as to provide a sufficient air flow to quench the arc when the insert closest to the outlet is burned through.

Figure 6:
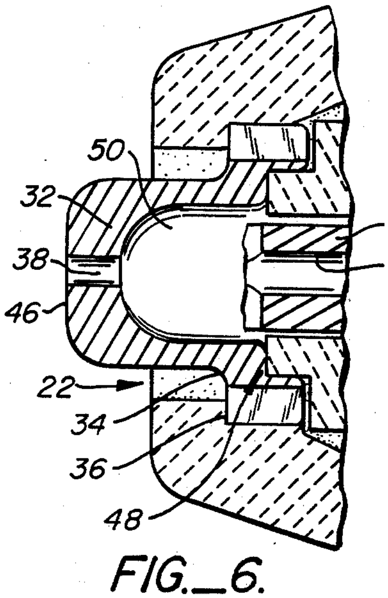
FIG. 6 is a cross-sectional view of the front part (torch head) illustrating the blow-out feature with the electrode insert burned away.

When the torch is operated for a long period of time the insert will gradually burn away until it is entirely consumed. At this moment, the end of axial passage 116 closest to the burned out element will suddenly be opened to communication with annular space 50. Since the diameter and therefore the cross sectional flow area of axial passage 116 is greater than that of combined cross sectional flow areas of passage 120, there will be a sudden increase in gas flow into annular space 50 which will flow out through orifice 38 in tip 32 and quench the transferred arc as seen in FIG. 6. This prevents the overheating which would otherwise occur if the electrode were allowed to continue to errode back into the torch body which would cause overheating.

DETAILED DESCRIPTION OF THE ALTERNATE EMBODIMENT

Figure 7:
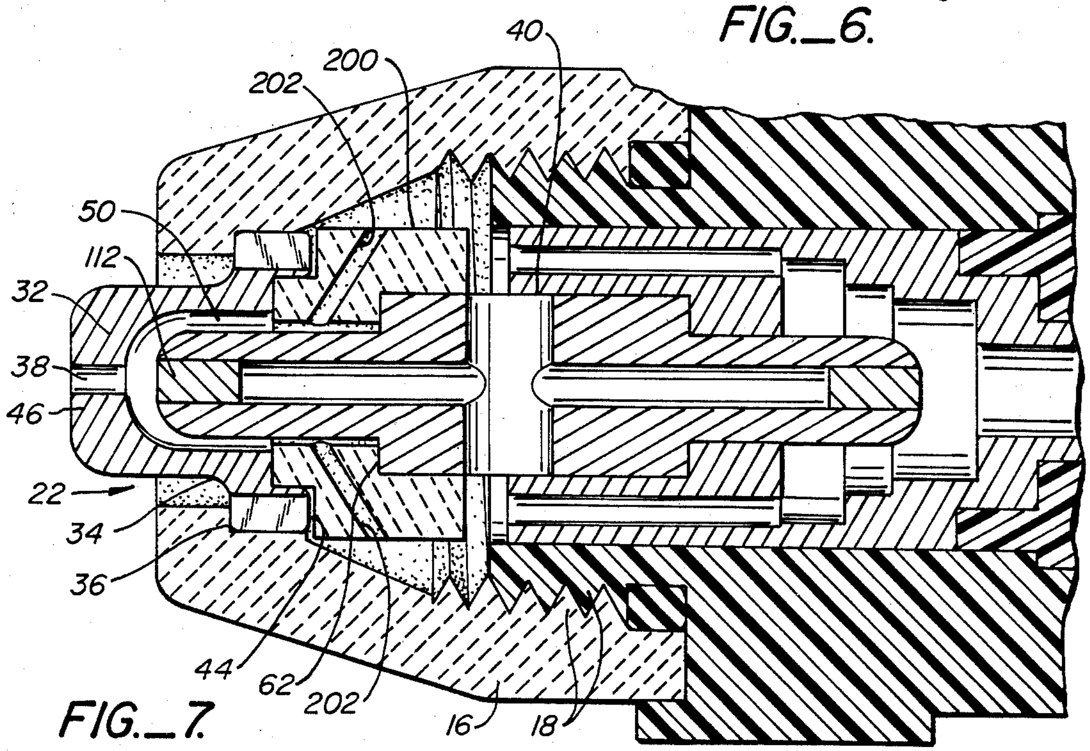
FIG. 7 is a partial cross-sectional view of the front part (torch head) of a plasma torch illustrating an alternate embodiment of this invention.

FIG. 7 is a partial, cross-sectional view of the front portion or torch head illustrating the alternate embodiment of this invention. For purposes of differentiation, structure not having an analagous counterpart in the aforementioned first or preferred embodiment will be identified by a three digit number beginning with the number "2".

The alternate embodiment is very similar to the first or preferred embodiment except for the elimination of the transverse passages at the opposite ends of the cathode 40. Rather than an annular insulator, an annular gas distributor 200 having a plurality of spaced passages 202 is provided. In this manner, gas flows from portion 20*a*, through passages 202 in gas distributor 200, and thence through second annular chamber 82 into annular chamber 50. From annular chamber 50, the gas passes out through orifice 38 as before.

The above description of method and construction used is merely illustrative thereof and various changes in shapes and sizes, materials or other details of the method and construction may be within the scope of the appended claims.

I claim:

1. A cathode for use in a plasma arc cutting torch comprising:

a generally elongated electrode defining a central axis and a pair of opposite ends, an axial passage within said electrode, inserts in said axial passage within each of said opposite ends, so as to close off communication with the exterior of said electrode, and a first transverse passage intermediate said opposite ends intercommunicating said axial passage with the exterior of said electrode.

2. The invention of claim 1 further including a second transverse passage in said electrode intermediate one of said opposite ends and said firsts transverse passage, said second transverse passage intercommunicating said axial passage with the exterior of said electrode.

3. The invention of claim 2 further including a third transverse passage in said electrode intermediate the other of said opposite ends and said first transverse passage, said third transverse passage intercommunicating said axial passage with the exterior of said electrode on opposite sides thereof.

4. The invention of claim 2 wherein said second transverse passage is tangent to said axial passage so as to impart swirl motion to gas flowing therethrough.

5. The invention of claim 1 wherein said electrode is made of an electrically conductive material.

6. The invention of claim 1 wherein said inserts are made of metal material.

7. The invention of claim 1 wherein said electrode has an enlarged intermediate diameter portion defining a pair of annular shoulders for purposes of gripping.

8. The invention of claim 1 wherein said electrode is made of an electrically conductive material.

9. The invention of claim 1 wherein said inserts are made of metal material.

10. The invention of claim 2 wherein the cross-sectional area ratio of said axial passage to said second transverse passage is about 2:1.

11. A plasma arc cutting torch for operating on a workpiece comprising:

a torch housing defining a chamber which has an outlet at an end of the housing;

means for supplying a gas to the chamber, said gas being suitable for generating a plasma and for a secondary gas flow which will cool the torch and the workpiece;

an electrode in the chamber adjacent to the outlet, said electrode being generally elongated and defining a central axis and a pair of opposite ends, an axial passage within said electrode, a first transverse passage intermediate said opposite ends intercommunicating said axial passage with the exterior of said electrode;

inserts in said axial passage within each of said opposite ends so as to close off communicationg with the exterior of said electrode; and means in the chamber for separating said gas into a primary gas flow adjacent to the electrode for generating a plasma and a secondary gas flow away from the electrode for cooling the torch and the workpiece.

12. The invention of claim 11 further including a second transverse passage in said electrode intermediate one of said opposite ends and said first transverse passage, said second transverse passage intercommunicating said axial passage with the exterior of said electrode.

13. The invention of claim 12 further including a third transverse passage in said electrode intermediate the other of said opposite ends and said first transverse passage, said third transverse passage intercommunicating said axial passage with the exterior of said electrode on opposite sides thereof.

14. The invention of claim 13 wherein said second transverse passage is tangent to said axial passage so as to impart a swirl motion to gas flowing therethrough.

15. The invention of claim 11 wherein said electrode is made of an electrically conductive material.

16. The invention of claim 11 wherein said inserts are made of metal material.

17. The invention of claim 11 wherein said electrode has an enlarged intermediate diameter portion defining a pair of annular shoulders for purposes of gripping.

18. The plasma arc cutting torch of claim 11, wherein said electrode is elongated with one end facing the outlet and wherein said gas separating means comprises:

a cup-shaped torch tip having a rim in the shape of an annular flange which is shaped to fit into the outlet of the torch housing thereby closing said outlet, wherein said torch tip surrounds said end of the electrode and defines a first annular chamber between it and the electrode for passage of the primary gas flow, said tip further defining a passageway in the bottom of the cup-shaped tip for passage of a transferred arc and slots in its rim for passage of gas from the housing chamber towards the workpiece to form the secondary gas flow; and an annular gas distributor surrounding the electrode, said distributor being so shaped and so connected to the torch tip and electrode that it defines a second annular chamber between it and the electrode in communication with the first annular chamber at one end and closed at the other end, said distributor further defining therein a plurality of channels substantially tangential to the second annular chamber and connecting the housing chamber to the second annular chamber so that gas from the gas supplying means will travel from the chamber to the second and first annular chambers through said channels forming a primary gas flow and generating a vortex at said end of the electrode for directing the transferred arc from said end of the electrode to the workpiece through the passageway.

* * * * *

UNITED STATES PATENT AND TRADEMARK OFFICE

CERTIFICATE OF CORRECTION

PATENT NO. : 4,558,201

DATED : Dec. 10, 1985

INVENTOR(S) : Hatch

It is certified that error appears in the above-identified patent and that said Letters Patent is hereby corrected as shown below:

Col. 5, line 50: "firsts" should read --first--;

Col. 5, line 61: insert --a-- between "impart" and "swirl";

Col. 6, lines 1-4: delete claims 8 and 9; and

Col. 6, line 24: "communicationg" should read --communicating--.

Signed and Sealed this

*Fifteenth* Day of *April 1986*

[SEAL]

*Attest:*

DONALD J. QUIGG

*Attesting Officer* *Commissioner of Patents and Trademarks*

UNITED STATES PATENT AND TRADEMARK OFFICE
CERTIFICATE OF CORRECTION

PATENT NO. : 4,558,201

DATED : Dec. 10, 1985

INVENTOR(S) : Hatch

It is certified that error appears in the above-identified patent and that said Letters Patent is hereby corrected as shown below:

Column 5, lines 23-24 and line 37: replace "cathode" with --electrode--.

Signed and Sealed this

Nineteenth Day of January, 1988

*Attest:*

DONALD J. QUIGG

*Attesting Officer*

*Commissioner of Patents and Trademarks*